(12) United States Patent
Xiao et al.

(10) Patent No.: US 10,983,573 B2
(45) Date of Patent: Apr. 20, 2021

(54) PORTABLE INFORMATION APPARATUS HAVING A DISPLAY

(71) Applicant: LENOVO (SINGAPORE) PTE. LTD., Singapore (SG)

(72) Inventors: Limin Xiao, Kanagawa (JP); Hidetoshi Mori, Kanagawa (JP); Moriyuki Tsuchihashi, Kanagawa (JP)

( * ) Notice: Subject to any disclaimer, the term of this patent is extended or adjusted under 35 U.S.C. 154(b) by 0 days.

(21) Appl. No.: 16/555,771

(22) Filed: Aug. 29, 2019

(65) Prior Publication Data

US 2020/0073448 A1 Mar. 5, 2020

(30) Foreign Application Priority Data

Aug. 31, 2018 (JP) .............................. JP2018-163047

(51) Int. Cl.
| | |
|---|---|
| *G06F 1/16* | (2006.01) |
| *G06F 3/044* | (2006.01) |
| *G06F 3/02* | (2006.01) |
| *G06F 3/041* | (2006.01) |

(52) U.S. Cl.
CPC .......... *G06F 1/1692* (2013.01); *G06F 1/1616* (2013.01); *G06F 1/1637* (2013.01); *G06F 1/1662* (2013.01); *G06F 1/1677* (2013.01); *G06F 1/1681* (2013.01); *G06F 3/0202* (2013.01); *G06F 3/0416* (2013.01); *G06F 3/0443* (2019.05); *G06F 3/0445* (2019.05);
(Continued)

(58) Field of Classification Search
CPC ......... G06F 1/1613–1616; G06F 1/162; G06F 1/1637; G06F 1/1662; G06F 1/1667; G06F 1/1671; G06F 1/1677; G06F 1/1681; G06F 1/169; G06F 1/1692; G06F 3/0202; G06F 3/0219; G06F 3/0416; G06F 3/044; G06F 3/0443; G06F 3/0445; G06F 3/0446; G06F 3/0448; G06F 3/047; G06F 2203/04111; G06F 2203/04112
See application file for complete search history.

(56) References Cited

U.S. PATENT DOCUMENTS

| | | | |
|---|---|---|---|
| 8,832,574 B2 * | 9/2014 | Ostergard ............... | G06F 3/016 715/768 |
| 2003/0224832 A1* | 12/2003 | King ................. | H04M 1/72583 455/566 |
| 2008/0309640 A1 | 12/2008 | Hong | |

(Continued)

FOREIGN PATENT DOCUMENTS

| | | |
|---|---|---|
| JP | 200244616 A | 9/2000 |
| JP | 2006277739 A | 10/2006 |

(Continued)

*Primary Examiner* — Nathan Danielsen (57) ABSTRACT

An electronic apparatus having a display is disclosed. The electronic apparatus includes a first main body having a first touch sensor; a second main body having a second touch sensor; a detecting unit that detects whether the second main body is in an open state or in a closed state; and a control unit that controls the first and second touch sensors. When the detecting unit has detected that the second main body is in the open state, the control unit enables the first touch sensor and disables the second touch sensor. When the detecting unit has detected that the second main body is in the closed state, the control unit enables the second touch sensor and disables the first touch sensor.

17 Claims, 7 Drawing Sheets

(52) U.S. Cl.
CPC .. *G06F 3/0446* (2019.05); *G06F 2203/04111* (2013.01); *G06F 2203/04112* (2013.01)

(56) References Cited

U.S. PATENT DOCUMENTS

| | | | |
|---|---|---|---|
| 2013/0088431 A1* | 4/2013 | Ballagas | G06F 1/1626 345/168 |
| 2013/0321287 A1* | 12/2013 | Adamson | G06F 1/3259 345/173 |
| 2013/0321288 A1 | 12/2013 | Adamson et al. | |
| 2014/0205799 A1* | 7/2014 | Lin | G01B 7/31 428/138 |
| 2014/0253477 A1* | 9/2014 | Shim | G06F 3/0416 345/173 |
| 2016/0306487 A1* | 10/2016 | Jeong | G06F 3/044 |
| 2017/0089632 A1* | 3/2017 | Kang | A47F 3/0426 |
| 2018/0113600 A1* | 4/2018 | Seymour | G06F 3/0238 |

FOREIGN PATENT DOCUMENTS

| | | |
|---|---|---|
| JP | 2010020744 A | 1/2010 |
| JP | 2010066918 A | 3/2010 |
| JP | 2011014149 A | 1/2011 |
| JP | 2012138706 A | 7/2012 |
| JP | 2013524320 A | 6/2013 |
| JP | 2016-164731 A | 9/2016 |

\* cited by examiner

PORTABLE INFORMATION APPARATUS HAVING A DISPLAY

PRIORITY CLAIM

The present application claims benefit of priority under 35 U.S.C. §§ 120, 365 to the previously filed Japanese Patent Application No. JP2018-163047 with a priority date of Aug. 31, 2018, which is incorporated by reference herein.

TECHNICAL FIELD

The present invention relates to electronic apparatuses in general, and in particular to a portable information apparatus having a display.

BACKGROUND

An electronic apparatus typically includes a first main body and a second main body to be movable with respect to the first main body. The first main body commonly includes a display unit, etc., and a second main body commonly includes a keyboard, etc.

In some of the above-mentioned electronic apparatuses, a display unit provided in the first main body may have a touch sensor. In that case, when the second main body overlaps with the first main body, there is a possibility that the display unit provided in the first main body may be hidden and unable to be operated.

The present disclosure provides an electronic apparatus having a display unit provided in a first main body to be operated as a touch panel when a second main body overlaps with the first main body.

SUMMARY

In accordance with an embodiment of the present disclosure, an electronic apparatus includes a first main body having a display unit and a first touch sensor provided in a position that overlaps with the display unit; a second main body having a second touch sensor and is configured to be relatively movable with respect to the first main body between an open state and a closed state in which the second main body covers a surface of the first main body where the display unit is located; a detecting unit that detects whether the second main body is in the open state or in the closed state; and a control unit that controls the first touch sensor and the second touch sensor. The second touch sensor is provided in a position that overlaps with the display unit when the second main body is in the closed state. The control unit enables the first touch sensor and disables the second touch sensor when the detecting unit has detected that the second main body is in the open state, and to enable the second touch sensor and disables the first touch sensor when the detecting unit has detected that the second main body is in the closed state.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
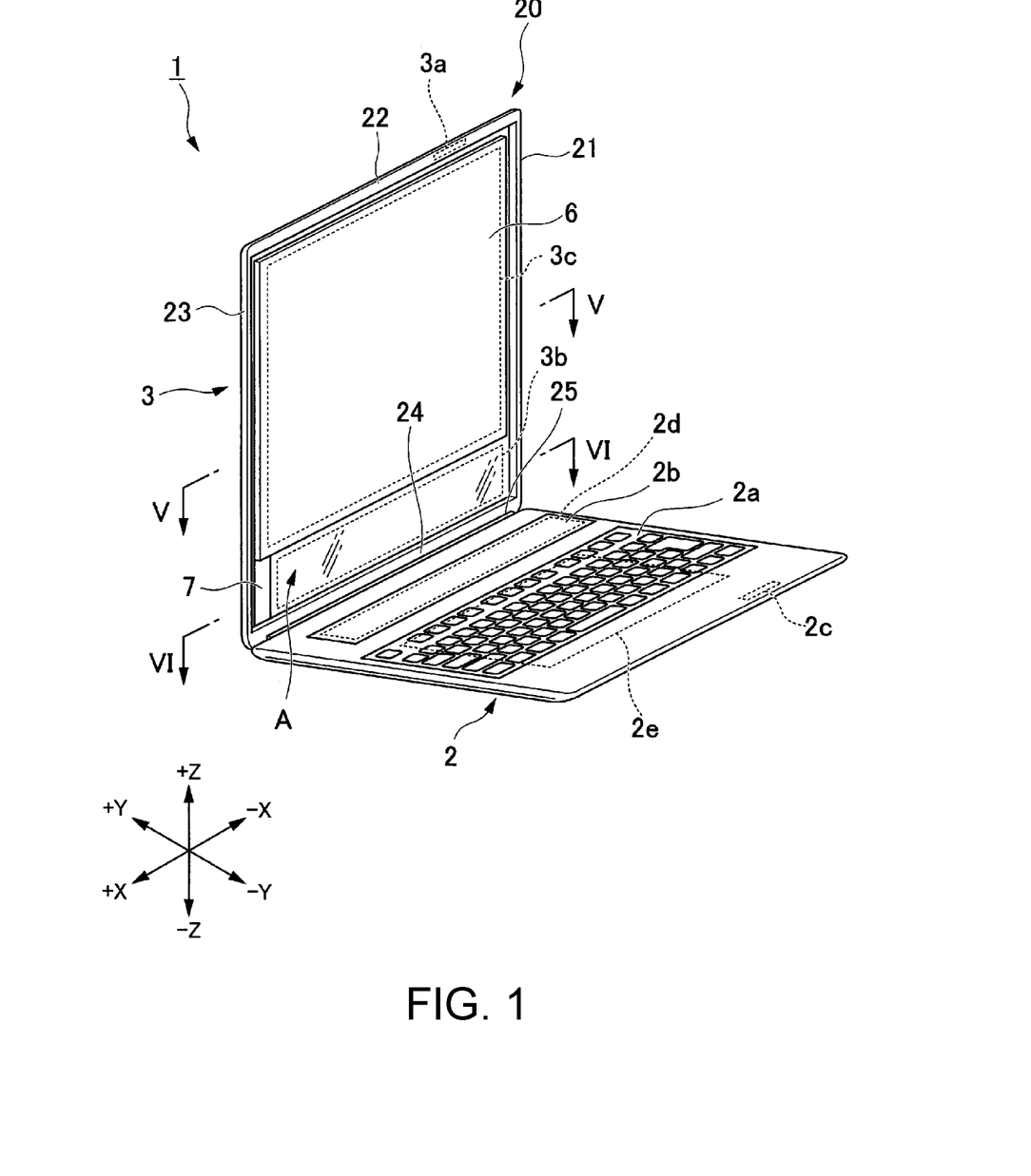
FIG. 1 is a perspective view of an electronic apparatus, according to one embodiment.

As shown in FIG. 1, an electronic apparatus 1 is a so-called clamshell (laptop) personal computer that includes a first main body 2 (a main body part) and a second main body 3 (a movable part). The first main body 2 and the second main body 3 are relatively movable around a hinge 25 between a state where the second main body 3 is open with respect to the first main body 2 and a state where the second main body 3 is closed with respect to the first main body 2. That is, the second main body 3 and the first main body 2 can overlap each other. The present embodiment may be applied not only to a laptop PC but also to electronic apparatuses such as a tablet terminal and a mobile phone.

I. Definition of Directions

In the present embodiment, a positional relationship between components is described with an XYZ Cartesian coordinate system. Hereinafter, a direction along the X-axis is referred to as a right-left direction X; a direction along the Y-axis is referred to as a front-rear direction Y; and a direction along the Z-axis is referred to as a top-bottom direction Z. Furthermore, one side in the right-left direction X is referred to as the +X side (the left), and the other side is referred to as the -X side (the right). One side in the front-rear direction Y is referred to as the +Y side (the rear), and the other side is referred to as the -Y side (the front). One side in the top-bottom direction Z is referred to as the +Z side (the top), and the other side is referred to as the -Z side (the bottom).

The hinge 25 connects a -Z-side end of the second main body 3 and a +Y-side end of the first main body 2, and extends in the right-left direction X. The hinge 25 allows the second main body 3 to make a rotational movement between an open state and a closed state with respect to the first main body 2. It is to be noted that the closed state is a state where the second main body 3 overlaps with the first main body 2, and covers a surface of the first main body 2 where a display unit 2b (to be described later) is. The open state is a state where the second main body 3 has moved at least a predetermined amount of distance from the closed state, and thus the display unit 2b to be described later is exposed.

It is to be noted that in the following description, unless otherwise specially noted, the positional relationship between components is described on the basis of a posture of the second main body 3 when its height and length extend in the top-bottom direction Z and the right-left direction X, respectively.

II. First Main Body

The first main body 2 includes a flat chassis with its length and width extending in the right-left direction X and the front-rear direction Y, respectively. Inside the chassis, a motherboard (a circuit board), a battery, etc. are installed. The first main body 2 is rotatably connected to the second main body 3 through the hinge 25. It is to be noted that the first main body 2 and the second main body 3 may be configured to be separable from each other.

The first main body 2 is provided with an input unit 2a, the display unit 2b, a detecting unit 2c, a touch sensor 2d (a first touch sensor), and a control unit 2e.

The input unit 2a is, for example, a keyboard.

The display unit 2b is, for example, a liquid crystal display (LCD) or an organic electroluminescence (EL) display. The display unit 2b has a rectangular shape that is long in the right-left direction X and short in the front-rear direction Y. The display unit 2b is located closer to the +Y side than the input unit 2a is. In other words, the display unit 2b is provided in a position closer to the hinge 25 than the input unit 2a is.

The touch sensor 2d is provided in a position that overlaps with the display unit 2b. The touch sensor 2d covers the display unit 2b from the +Z side. The display unit 2b and the touch sensor 2d constitute one touch panel. A surface of the touch sensor 2d is covered with a transparent cover 2f (see FIGS. 8A and 8B).

The touch sensor 2d is configured to be able to detect a position where a user has touched. Furthermore, the touch sensor 2d is transparent, and thus the display unit 2b is visually recognizable through the transparent cover 2f and the touch sensor 2d.

Figure 2A:
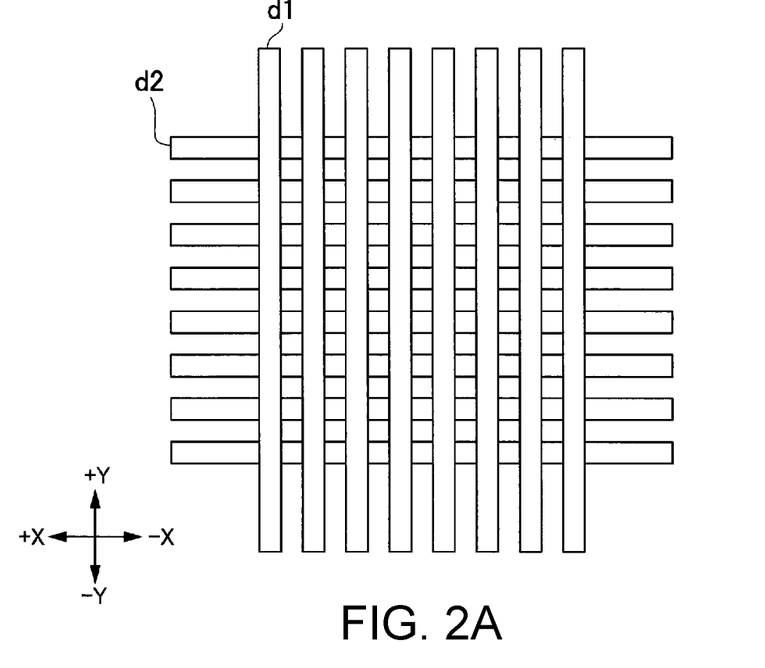
FIG. 2A is a diagram showing an example of a touch sensor.
Figure 2B:
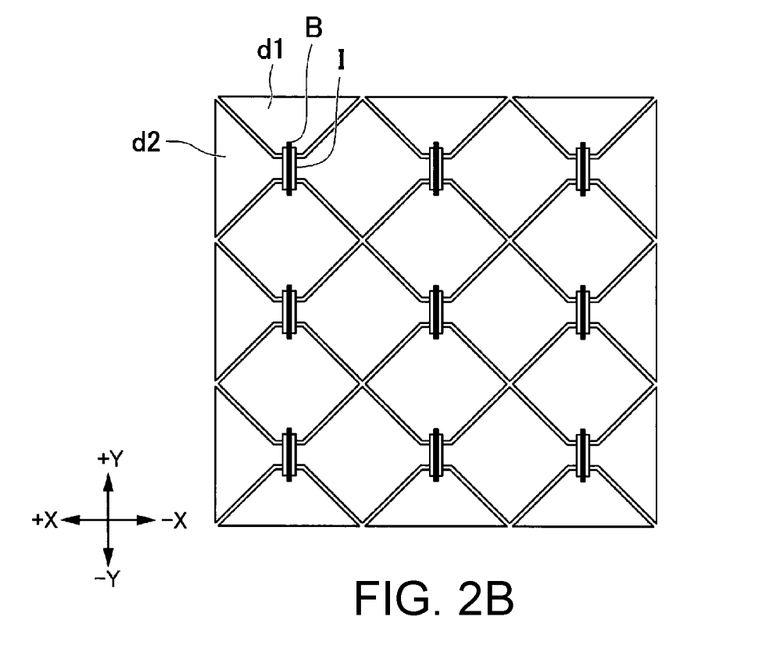
FIG. 2B is a diagram showing another example of a touch sensor.

As the touch sensor 2d, for example, capacitive sensors shown in FIGS. 2A and 2B can be used. In FIGS. 2A and 2B, the sensors have multiple first conductors d1 and multiple second conductors d2. The first conductors d1 and the second conductors d2 are insulated from each other. The multiple first conductors d1 extend in the front-rear direction Y, and are aligned in the right-left direction X. The multiple second conductors d2 extend in the right-left direction X, and are aligned in the front-rear direction Y. In this way, the first conductors d1 and the second conductors d2 extend in directions perpendicular to each other, and form multiple points of intersection when viewed from the top-bottom direction Z. The capacitance at each point of intersection changes when touched by the user. Thus, by detecting a change in the capacitance, an area touched by the user can be identified.

In an example of FIG. 2A, the first conductors d1 and the second conductors d2 are formed into straight lines. As the first conductors d1 and the second conductors d2, superfine copper wire mesh (for example, with a width of about 1 to 10 μm) or indium tin oxide (ITO) tile can be used. In FIG. 2A, for example, the multiple first conductors d1 may be provided on one of surfaces of one insulator film, and the multiple second conductors d2 may be provided on the other surface. Furthermore, an insulator film provided with the first conductors d1 may be superimposed on an insulator film provided with the second conductors d2. These configurations can generate capacitance between the first conductors d1 and the second conductors d2 while insulating the first conductors d1 from the second conductors d2. In a configuration shown in FIG. 2A, one touch sensor has two electrode layers: an electrode layer including the multiple first conductors d1 and an electrode layer including the multiple second conductors d2.

In an example of FIG. 2B, the first conductors d1 and the second conductors d2 form a shape of a plurality of rectangles joined together. At points of intersection between the first conductors d1 and the second conductors d2, the rectangular first conductors d1 are connected by bridge wires B. By providing insulators I between the bridge wires B and the second conductors d2, capacitance can be generated between the first conductors d1 and the second conductors d2 while the first conductors d1 and the second conductors d2 are insulated from each other. In a configuration shown in FIG. 2B, one touch sensor has one electrode layer including the multiple first conductors d1 and the multiple second conductors d2.

Figure 3A:
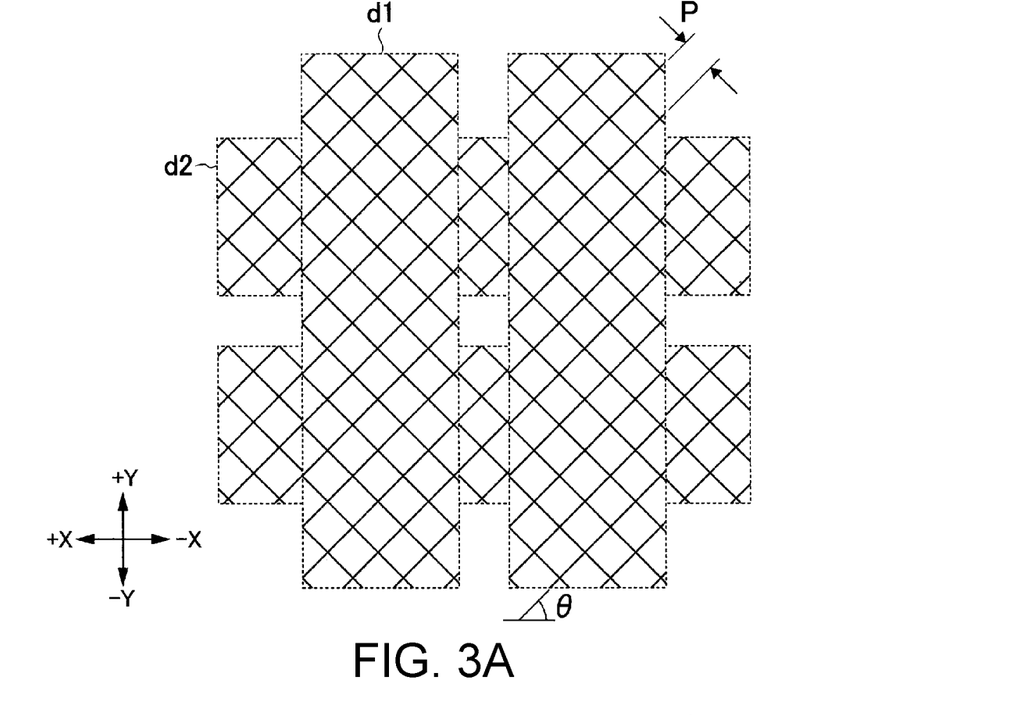
FIG. 3A is a diagram showing a case where the touch sensor shown in FIG. 2A is made of thin wire mesh.
Figure 3B:
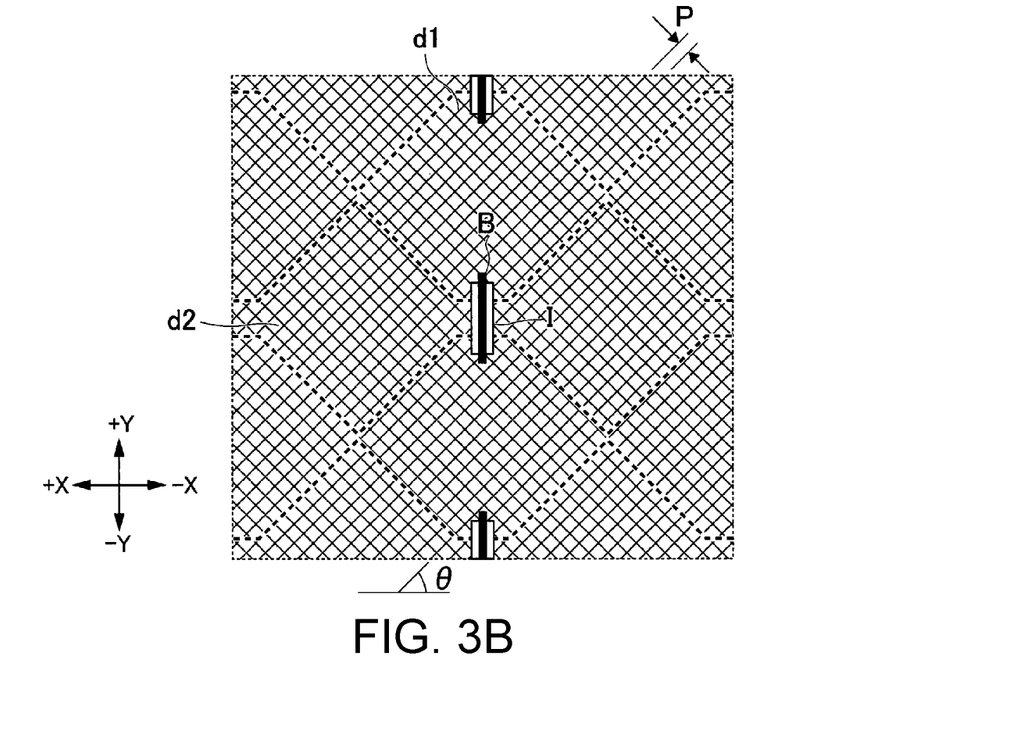
FIG. 3B is a diagram showing a case where the touch sensor shown in FIG. 2B is made of thin wire mesh.

FIGS. 3A and 3B are schematic diagrams showing cases where the respective conductors d1 and d2 shown in FIGS. 2A and 2B are made of thin metallic wire mesh. As shown in FIGS. 3A and 3B, in thin metallic wire mesh, the plurality of the thin metallic wires are disposed at a predetermined pitch in two orthogonal directions so as to cross each other. This pitch may be an equal pitch, or may be an unequal pitch. Hereinafter, the pitch of the thin metallic wire mesh is referred to as a micro pitch P. Furthermore, an angle of thin metallic wire with respect to the right-left direction X is referred to as a mesh angle θ.

The control unit 2e shown in FIG. 1 controls the touch sensor 2d and a touch sensor 3b (to be described later) on the basis of a result of detection by the detecting unit 2c, and puts them into an enabled (ON) state or a disabled (OFF) state. The control unit 2e may be part of the motherboard, or may be part of a circuit board other than the motherboard.

The detecting unit 2c detects whether the second main body 3 is in the open state or in the closed state. The detecting unit 2c is provided at a −Y-side end of the first main body 2. An object 3a to be detected is provided at a +Z-side end of the second main body 3. The detecting unit 2c and the object 3a to be detected are provided in positions identical in the right-left direction X. Thus, when the second main body 3 is in the closed state, the detecting unit 2c of the first main body 2 and the object 3a to be detected of the second main body 3 face each other. As the detecting unit 2c, a magnetic sensor, such as a Hall sensor, can be used. As the object 3a to be detected, a magnet can be used. The detecting unit 2c detects a change in a magnetic field caused by the object 3a to be detected in accordance with the movement of the second main body 3 between the open state and the closed state, and therefore can detect whether the second main body 3 is in the open state or in the closed state.

It is to be noted that the detecting unit 2c may be provided in the second main body 3, and the object 3a to be detected may be provided in the first main body 2. Furthermore, a sensor (for example, an infrared sensor) other than a magnetic sensor may be used as the detecting unit 2c.

III. Second Main Body

The second main body 3 includes a display 6. The display 6 is, for example, an LCD or an organic EL display. A wire 7 is connected to the display 6. The display 6 and the motherboard, etc. of the first main body 2 are electrically connected through the wire 7.

The second main body 3 has a transparent region A. When the second main body 3 is viewed from the front-rear direction Y, except for a portion connected to the wire 7, the display 6 is surrounded by the transparent region A. This makes the display 6 appear to be floating in the air. It is to be noted that the transparent region A need not surround the display 6. However, it is preferable that the transparent region A be provided in a position that covers the display unit 2b of the first main body 2 when the second main body 3 is in the closed state.

Figure 4:
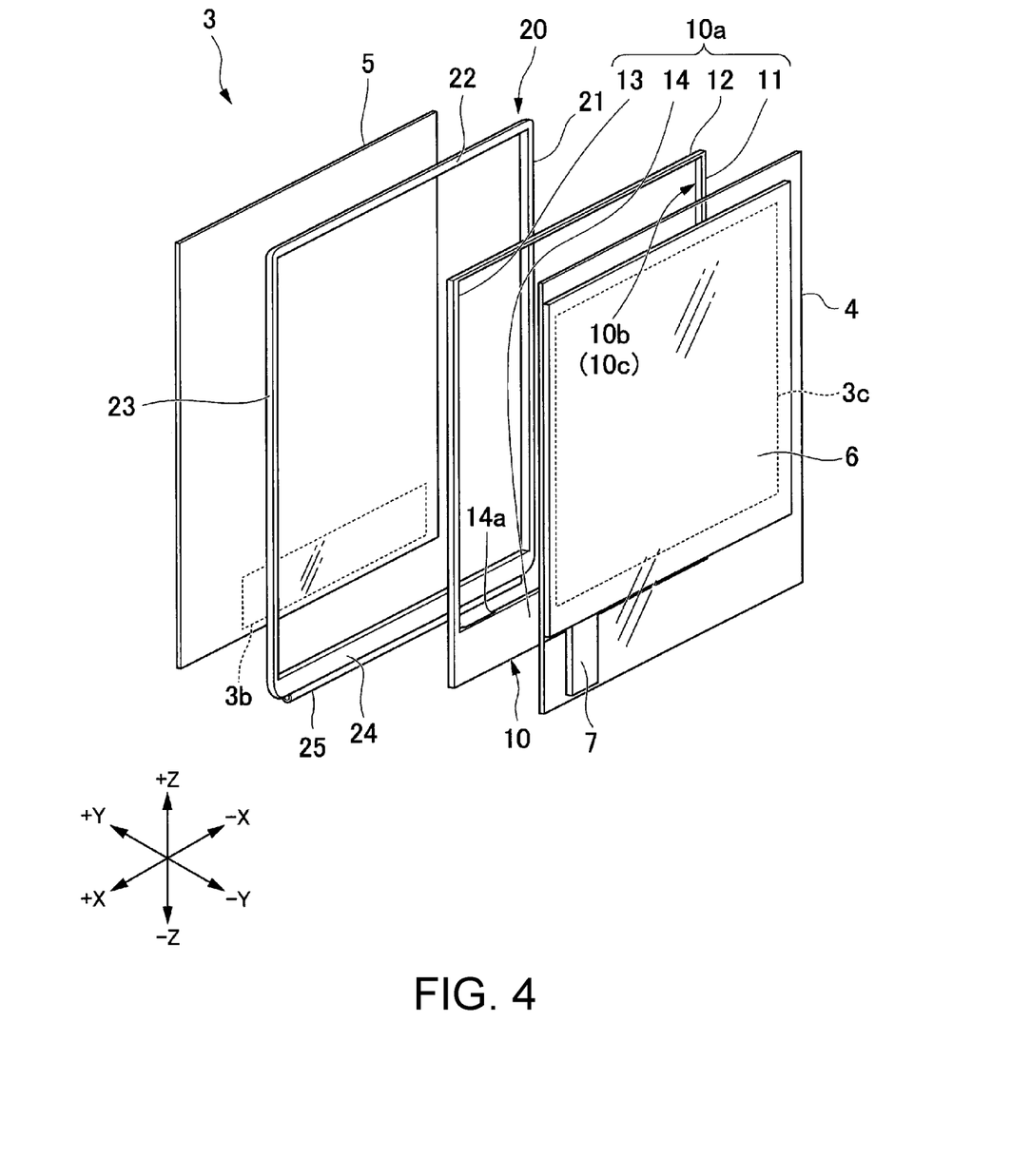
FIG. 4 is an exploded perspective view of a second main body shown in FIG. 1.

As shown in FIG. 4, the second main body 3 includes a first transparent plate 4, a transparent member 10, a frame body 20, a second transparent plate 5, the display 6, the touch sensor 3b (a second touch sensor), and a touch sensor 3c (a third touch sensor). It is to be noted that the second main body 3 need not include the touch sensor 3c. The transparent region A is made up by an overlap of the first transparent plate 4, the transparent member 10, and the second transparent plate 5 in the front-rear direction Y. It is to be noted that the touch sensor 3b is located within the transparent region A.

The first transparent plate 4 and the second transparent plate 5 hold the frame body 20, the transparent member 10, and the display 6 in the front-rear direction Y between them. The first transparent plate 4 is located closer to the −Y side than the display 6 is, and the second transparent plate 5 is located closer to the +Y side than the display 6 is.

The first transparent plate 4 and the second transparent plate 5 are formed into a transparent plate with its height and length extending in the top-bottom direction Z and the right-left direction X, respectively. In the present embodiment, the first transparent plate 4 and the second transparent plate 5 are formed into a rectangle when viewed from the front-rear direction Y. As the first transparent plate 4 and the second transparent plate 5, for example, glass or transparent resin can be used.

The frame body 20 is made of, for example, metal. The frame body 20 includes a right frame 21, a top frame 22, a left frame 23, and a bottom frame 24. The frame body 20 is formed of these frames 21 to 24 into a rectangular frame when viewed from the front-rear direction Y. The right frame 21 and the left frame 23 extend in the top-bottom direction Z, and the top frame 22 and the bottom frame 24 extend in the right-left direction X. The top frame 22 connects respective +Z-side ends of the right frame 21 and the left frame 23. The bottom frame 24 connects respective −Z-side ends of the right frame 21 and the left frame 23.

The hinge 25 is provided on a −Z-side end of the bottom frame 24.

Figure 5:
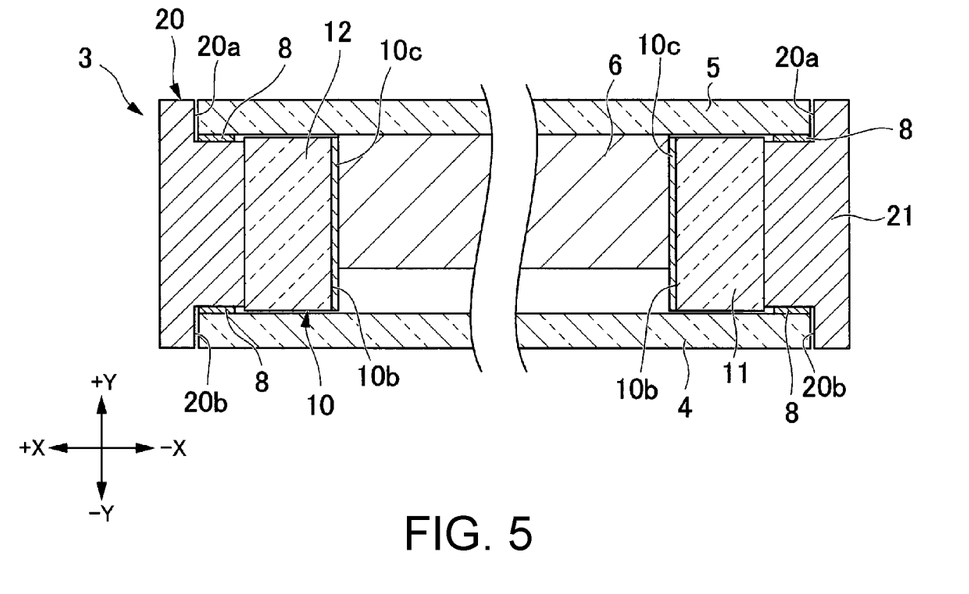
FIG. 5 is a cross-sectional view of the second main body along a line V-V shown in FIG. 1.

As shown in FIG. 5, the frame body 20 has a first recessed portion 20a and a second recessed portion 20b. The first recessed portion 20a is recessed from a +Y-side end surface of the frame body 20 toward the −Y side. The second recessed portion 20b is recessed from a −Y-side end surface of the frame body 20 toward the +Y side. The first recessed portion 20a and the second recessed portion 20b are formed along the frames 21 to 24 of the frame body 20. Thus, the recessed portions 20a and 20b are formed into a rectangular frame when viewed from the front-rear direction Y.

The recessed portions 20a and 20b are formed on a +X-side end of the right frame 21, a −Z-side end of the top frame 22, a −X-side end of the left frame 23, and a +Z-side end of the bottom frame 24. Respective dimensions of the recessed portions 20a and 20b in the right-left direction X are greater than respective dimensions of the first and second transparent plates 4 and 5 in the right-left direction X. Respective dimensions of the recessed portions 20a and 20b in the top-bottom direction Z are greater than respective dimensions of the first and second transparent plates 4 and 5 in the top-bottom direction Z.

At least a portion of the first transparent plate 4 is located inside the first recessed portion 20a. The first transparent plate 4 is attached to an inner surface of the first recessed portion 20a with an adhesive 8. As the adhesive 8, for example, ultraviolet curing resin, thermoset resin, thermoplastic resin, or double-sided tape can be used. In an example of FIG. 5, the adhesive 8 is provided on an inner surface of the first recessed portion 20a that faces to the +Y side. Alternatively, the adhesives 8 may be provided on inner surfaces of the first recessed portion 20a that face to the right-left direction X.

At least a portion of the second transparent plate 5 is located inside the second recessed portion 20b. The second transparent plate 5 is attached to an inner surface of the second recessed portion 20b with the adhesive 8. In the example of FIG. 5, the adhesive 8 is provided on an inner surface of the second recessed portion 20b that faces to the −Y side. Alternatively, the adhesives 8 may be provided on inner surfaces of the second recessed portion 20b that face to the right-left direction X.

The first transparent plate 4 and the second transparent plate 5 are attached and fastened to the frame body 20 with the multiple adhesives 8. In the present embodiment, the entire first transparent plate 4 is located inside the first recessed portion 20a, and the entire second transparent plate 5 is located inside the second recessed portion 20b.

The display 6 is fastened to the first transparent plate 4. The display 6 is, for example, an LCD or an organic EL display. The user can visually recognize the display 6 through the first transparent plate 4. The display 6 is formed into a rectangle when viewed from the front-rear direction Y. The wire 7 is connected to a back surface (a +Y-side surface) of the display 6. A process of connecting the wire 7 to the display 6 can be performed after the display 6, the first transparent plate 4, and the transparent member 10 are assembled. Thus, even if the display 6 is fastened to the first transparent plate 4, the wire 7 can be housed in a wire housing 14a (to be described later) of the transparent member 10.

It is to be noted that in a case where the second main body 3 is used as a touch panel, the touch sensor 3c is provided between the display 6 and the first transparent plate 4.

The transparent member 10 is made of transparent resin. As a material of the transparent member 10, for example, polycarbonate (PC) or polymethyl methacrylate (PMMA) can be used. The transparent member 10 may be formed by injection molding, or may be formed by cutting.

As shown in FIG. 4, the transparent member 10 includes an enclosure 10a that surrounds the display 6. In the present embodiment, the enclosure 10a is formed into a rectangular frame so as to surround the rectangular display 6. The enclosure 10a has a right part 11, a top part 12, a left part 13, and a bottom part 14. The right part 11, the top part 12, the left part 13, and the bottom part 14 are integrally formed. That is, the enclosure 10a is integrally formed.

A gap between the right part 11 and the left part 13 in the right-left direction X is larger than a dimension of the display 6 in the right-left direction X. A gap between the top part 12 and the bottom part 14 in the top-bottom direction Z is larger than a dimension of the display 6 in the top-bottom direction Z.

A dimension of the transparent member 10 in the right-left direction X is smaller than a gap between the right frame 21 and the left frame 23 of the frame body 20 in the right-left direction X. A dimension of the transparent member 10 in the top-bottom direction Z is smaller than a gap between the top frame 22 and the bottom frame 24 of the frame body 20 in the top-bottom direction Z.

The right part 11 is located on the −X side of the display 6; the top part 12 is located on the +Z side of the display 6; the left part 13 is located on the +X side of the display 6; and the bottom part 14 is located on the −Z side of the display 6.

The right part 11 and the left part 13 extend in the top-bottom direction Z, and the top part 12 and the bottom part 14 extend in the right-left direction X. The top part 12 connects respective +Z-side ends of the right part 11 and the left part 13. The bottom part 14 connects respective −Z-side ends of the right part 11 and the left part 13.

A width of the bottom part 14 in the top-bottom direction Z is larger than a width of the top part 12 in the top-bottom direction Z. Furthermore, the width of the bottom part 14 in the top-bottom direction Z is larger than respective widths of the right part 11 and the left part 13 in the right-left direction X. That is, the width of the bottom part 14 is larger than those of the other parts 11 to 13 of the enclosure 10a.

The bottom part 14 is provided with the wire housing 14a. The wire housing 14a is a recessed portion formed on the bottom part 14. The wire housing 14a is recessed from a +Y-side end surface of the bottom part 14 toward the −Y side. The wire housing 14a is located at an end of the bottom part 14 in the right-left direction X. The wire housing 14a extends from a +Z-side end surface to a −Z-side end surface of the bottom part 14 in the top-bottom direction Z. That is, the wire housing 14a is formed so as to cross the bottom part 14 in the top-bottom direction Z.

Figure 6:
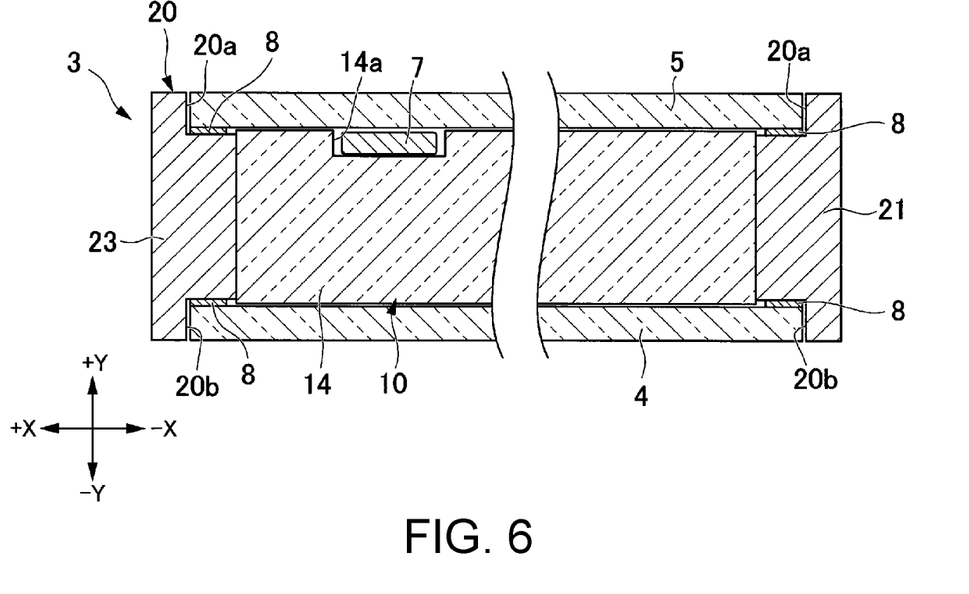
FIG. 6 is a cross-sectional view of the second main body along a line VI-VI shown in FIG. 1.

As shown in FIG. 6, a width of the wire housing 14a in the right-left direction X is larger than a width of the wire 7 in the right-left direction X. A width (a depth) of the wire housing 14a in the front-rear direction Y is larger than a thickness of the wire 7 in the front-rear direction Y. At least a portion of the wire 7 is located inside the wire housing 14a.

It is to be noted that the width of the wire housing 14a in the front-rear direction Y may be smaller than the thickness of the wire 7 in the front-rear direction Y. Also in this case, for example, by providing a gap in the front-rear direction Y between the transparent member 10 and the second transparent plate 5, the wire 7 can be housed in a space formed by the wire housing 14a and the second transparent plate 5.

As shown in FIG. 5, of the enclosure 10a, an inner surface 10b facing the display 6 is provided with a thin film 10c. It is to be noted that the inner surface 10b includes a +X-side end surface of the right part 11, a −Z-side end surface of the top part 12, a −X-side end surface of the left part 13, and the +Z-side end surface of the bottom part 14. As a material of the thin film 10c, metal such as aluminum is suitable. The thin film 10c can be provided on the surface of the inner surface 10b, for example, by vapor deposition or plating. By providing the thin film 10c on the surface of the inner surface 10b, for example, an end surface of the display 6 becomes less visually recognizable through the transparent member 10.

The transparent member 10 is located inside the frame body 20 formed into a frame. Furthermore, the display 6 is located inside the transparent member 10 formed into a frame. Then, the transparent member 10 and the display 6 are held between the first transparent plate 4 and the second transparent plate 5 in the front-rear direction Y.

In the above-described configuration, the transparent member 10 is provided to fill the gaps formed by the frame body 20, the display 6, the first transparent plate 4, and the second transparent plate 5.

Figure 7:
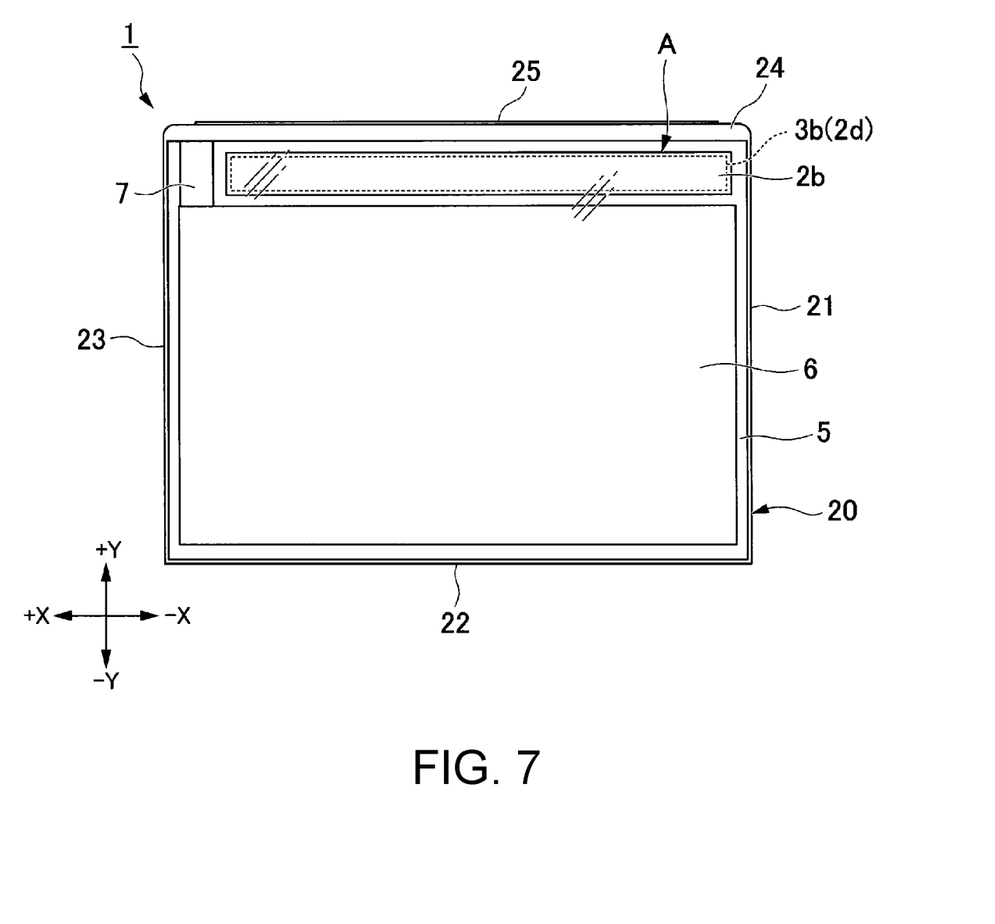
FIG. 7 is a diagram of the electronic apparatus viewed from the side of the second main body when the second main body shown in FIG. 1 is in a closed state.

FIG. 7 shows a state where the second main body 3 and the first main body 2 overlap each other after the second main body 3 has been moved rotationally around the hinge 25 from the state shown in FIG. 1.

As shown in FIG. 7, when the second main body 3 and the first main body 2 overlap each other, the positions of the transparent region A and the display unit 2b coincide with each other. More specifically, respective overlapping portions of the first transparent plate 4, the bottom part 14 of the transparent member 10, and the second transparent plate 5 cover the display unit 2b. Thus, the user can visually recognize the display unit 2b through the transparent region A.

As shown in FIG. 1, the second main body 3 here is provided with the touch sensor 3b (the second touch sensor) and the touch sensor 3c (the third touch sensor). The touch sensors 3b and 3c are configured to be able to detect a position where the user has touched. Furthermore, the touch sensors 3b and 3c are transparent. As the touch sensors 3b and 3c, a capacitive sensor (see FIGS. 2A and 2B) can be used, as with the touch sensor 2d. It is to be noted that the arrangement of the respective first conductors d1 included in the touch sensors 3b and 3c is described on the premise that the second main body 3 is in the closed state (a state where the lengths and widths of the touch sensors 3b and 3c extend in the right-left direction X and the front-rear direction Y, respectively).

The touch sensor 3c is provided in a position that overlaps with the display 6 when the display 6 is viewed from the front (the −Y side). The touch sensor 3c is provided on a +Y-side surface of the first transparent plate 4 (see FIG. 4). The user can visually recognize the display 6 through the first transparent plate 4 and the touch sensor 3c. Thus, the user can use the touch sensor 3c and the display 6 as one touch panel. In this case, the first transparent plate 4 serves as a cover glass of the touch sensor 3c. That is, the user can operate the touch sensor 3c by touching the surface of the first transparent plate 4.

The touch sensor 3b is located in, of a −Y side surface of the second transparent plate 5, a portion closer to the −Z side than the display 6 is. The touch sensor 3b overlaps with a portion of the bottom part 14 of the transparent member 10.

Figure 8A:
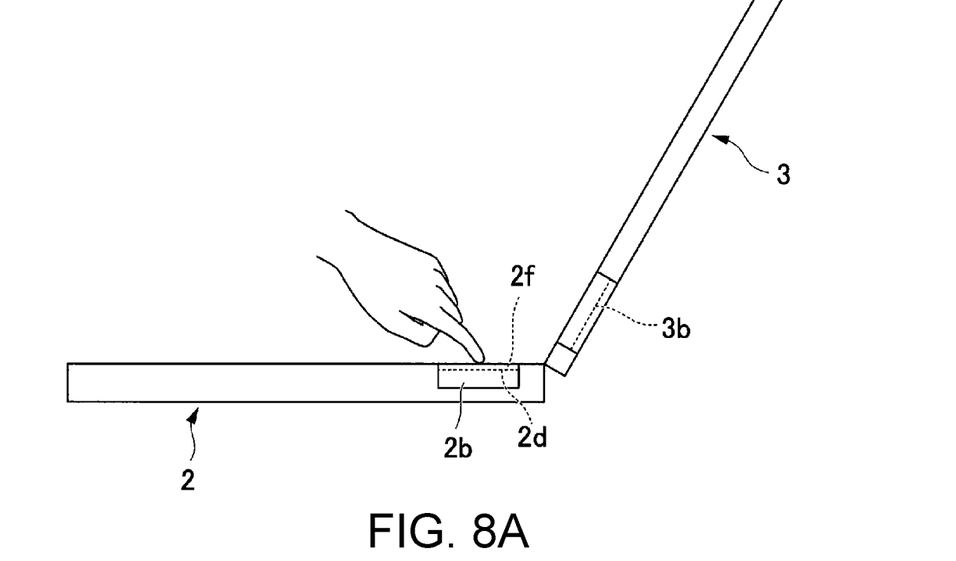
FIG. 8A is a diagram showing the use of the electronic apparatus shown in FIG. 1 when the second main body is in an open state.
Figure 8B:
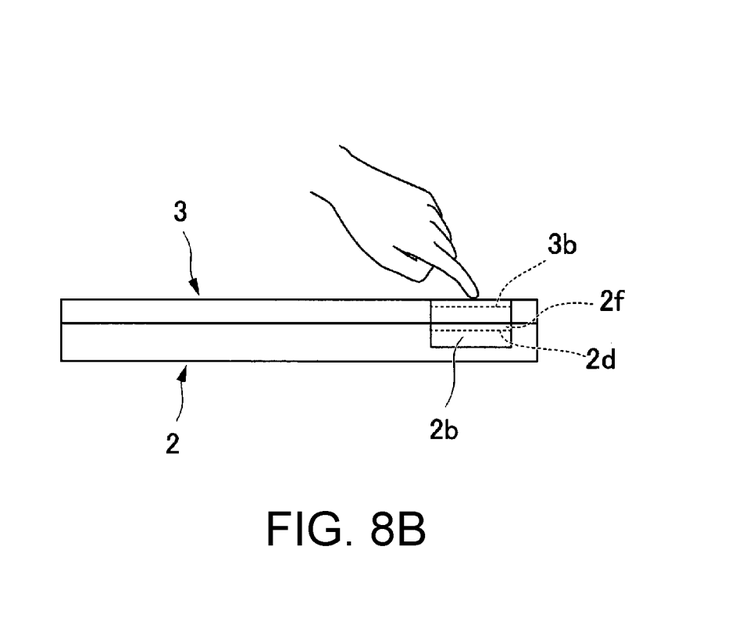
FIG. 8B is a diagram showing the use of the electronic apparatus shown in FIG. 1 when the second main body is in the closed state.

As shown in FIG. 7, the touch sensor 3b is provided in a position that, as viewed from the top-bottom direction Z, overlaps with the display unit 2b when the second main body 3 is in the closed state. The touch sensor 3b is transparent, and thus, when the second main body 3 is in the closed state, the display unit 2b is visually recognizable through the touch sensor 3b. Accordingly, the user can use the touch sensor 3b and the display unit 2b as one touch panel as shown in FIG. 8B. In this case, the second transparent plate 5 serves as a cover glass of the touch sensor 3b. That is, the user can operate the touch sensor 3b by touching the surface of the second transparent plate 5.

It is to be noted that in a case where the touch sensor 3b and the display unit 2b are used as one touch panel, the user visually recognizes the display unit 2b through the two touch sensors 3b and 2d. When the display unit 2b is viewed through the overlap of the two touch sensors 3b and 2d in this way, moire is generated due to the respective conductors d1 and d2 of the touch sensors 3b and 2d, which may lead to reduction in the visibility of the display unit 2b. In particular, such moire is likely to be generated if the conductors d1 and d2 are made of thin metallic wire mesh, like the ones shown in FIGS. 3A and 3B. To suppress the generation of moire, of the electrode layers included in the two touch sensors 3b and 2d, at least one electrode layer may be configured to have a different micro pitch P or mesh angle θ from the other electrode layers. Alternatively, the micro pitch P of the at least one electrode layer may be configured to be an unequal (random) pitch.

More specifically, in a case where the two touch sensors 3b and 2d are configured as shown in FIG. 3A, four electrode layers (the electrode layer including the first conductors d1 of the touch sensor 3b, the electrode layer including the second conductors d2 of the touch sensor 3b, the electrode layer including the first conductors d1 of the touch sensor 2d, and the electrode layer including the second conductors d2 of the touch sensor 2d) overlap one another. Therefore, of these four electrode layers, one electrode layer may be configured to have a different micro pitch P or mesh angle θ from the other three electrode layers. Alternatively, the four electrode layers may be configured to have different micro pitches P or mesh angles θ from one another. Furthermore, at least one of the four electrode layers may be configured to have an unequal micro pitch P.

Furthermore, in a case where the two touch sensors 3b and 2d are configured as shown in FIG. 3B, two electrode layers (the electrode layer including the conductors d1 and d2 of the touch sensor 3b and the electrode layer including the conductors d1 and d2 of the touch sensor 2d) overlap each other. Therefore, these two electrode layers may be configured to have different micro pitches P or mesh angles θ from each other. Alternatively, at least one of the two electrode layers may be configured to have an unequal micro pitch P.

The control unit 2e here enables the first touch sensor 2d and disables the second touch sensor 3b when the detecting unit 2c has detected that the second main body 3 is in the open state. Furthermore, the control unit 2e enables the second touch sensor 3b and disables the first touch sensor 2d when the detecting unit 2c has detected that the second main body 3 is in the closed state. The second main body 3 has the transparent region A, and the display unit 2b of the first main body 2 is visually recognizable through the transparent region A when the second main body 3 is in the closed state. Thus, in a case where the second main body 3 is in the open state as shown in FIG. 8A, the user can operate the first touch sensor 2d and the display unit 2b as one touch panel. Furthermore, in a case where the second main body 3 is in the closed state as shown in FIG. 8B, the user can operate the second touch sensor 3b and the display unit 2b as one touch panel.

That is, the user can operate the display unit 2b provided in the first main body 2 as a touch panel regardless of whether the second main body 3 is in the closed state or in the open state.

Moreover, the second main body 3 includes the touch sensor 3c (the third touch sensor) provided in a position that overlaps with the display 6. Thus, the second main body 3 can be used as one touch panel.

It is to be noted that the touch sensor 3b may have a higher sensitivity than the touch sensor 2d. In this case, even if the second transparent plate 5 serving as a cover glass of the touch sensor 3b is configured to be thicker than a cover glass of the touch sensor 2d, the touch sensor 3b can provide an operational feeling equal to that of the touch sensor 2d. That is, the strength of the second main body 3 can be increased by making the second transparent plate 5 thick while reduction in the operational feeling of the touch sensor 3b is suppressed. It is to be noted that for example, the touch sensor 3b may be provided on the +Y-side surface of the first transparent plate 4 so that the touch sensors 3b and 3c can be controlled by the same controller. In this case, it is possible to reduce costs as compared with a case where the touch sensors 3b and 3c are controlled by separate controllers.

Furthermore, the touch sensor 2d and the touch sensor 3b each have the multiple first conductors d1 extending in the front-rear direction Y (a first direction) and the multiple second conductors d2 extending in the right-left direction X (a second direction) perpendicular to the front-rear direction Y. At least either a repetition pitch P1 of the first conductors d1 or a repetition pitch P2 of the second conductors d2 may be different between the touch sensor 2d and the touch sensor 3b.

Alternatively, at least one of the repetition pitch P1 in the touch sensor 2d, the repetition pitch P2 in the touch sensor 2d, the repetition pitch P1 in the touch sensor 3b, and the repetition pitch P2 in the touch sensor 3b may be an unequal pitch.

In these cases, it is possible to reduce moire caused by the overlap of the conductors d1 and d2 of the touch sensor 2d and the conductors d1 and d2 of the touch sensor 3b when the second main body 3 is in the closed state. Therefore, it is possible to improve the visibility of the display unit 2b in a case where the touch sensor 3b and the display unit 2b are used as one touch panel.

Moreover, a surface of the transparent cover 2f that covers the touch sensor 2d may be coated with an antireflection film, and the surface of the second transparent plate 5 that covers the touch sensor 3b and the surface of the first transparent plate 4 that covers the touch sensor 3c need not be coated with an antireflection film. In this case, it is possible to suppress reflection of light in a case where the touch sensor 2d and the display unit 2b are used as one touch panel and to improve the visibility of the display unit 2b. Furthermore, in a case where the surfaces of the transparent plates 4 and 5 are coated with an antireflection film, the tone of color of the transparent region A is assumed to change. Therefore, the change in the tone of color of the transparent region A can be suppressed by not coating the surfaces of the transparent plates 4 and 5 with an antireflection film.

It is to be noted that the technical scope of the present invention is not limited to the above-described embodiment, and various modifications can be made without departing from the scope of the invention.

For example, in the above-described embodiment, the second main body 3 and the first main body 2 are connected so as to be rotationally movable around the hinge 25; however, the second main body 3 and the first main body 2 may be configured to make a slide movement. Furthermore, the second main body 3 may be configured to be removable from the first main body 2.

Also in these cases, the closed state of the second main body 3 is a state where the second main body 3 and the first main body 2 overlap each other; and the open state of the second main body 3 is a state where the second main body 3 has moved at least a predetermined amount of distance from the closed state, and thus the display unit 2b is exposed.

Moreover, instead of providing the touch sensor 3b in the second main body 3, the sensitivity of the touch sensor 2d may be configured to be variable. In this case, the control unit 2e may be configured to increase the sensitivity of the touch sensor 2d when the detecting unit 2c has detected that the second main body 3 has gone from the open state into the closed state and to decrease the sensitivity of the touch sensor 2d when the detecting unit 2c has detected that the second main body 3 has gone from the closed state into the open state. This configuration allows the touch sensor 2d to be operated through the transparent cover 2f in a case where the second main body 3 is in the open state. Furthermore, in a case where the second main body 3 is in the closed state, the touch sensor 2d can be operated through the second transparent plate 5. Therefore, the user can operate the display unit 2b provided in the first main body 2 as a touch panel regardless of whether the second main body 3 is in the closed state or in the open state.

As has been described, the present invention provides an electronic apparatus having a display unit provided in a first main body to be operated as a touch panel when a second main body overlaps with the first main body.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus, comprising:
    a first main body having a first display unit and a first touch sensor overlapping said first display unit, wherein said first main body further includes a keyboard provided on a same surface as said first display unit;
    a second main body having
        a second display unit,
        a transparent region, and
        a second touch sensor overlapping said transparent region, wherein the size of said transparent region is substantially identical to the size of said first display unit,
    wherein said second main body is rotatable with respect to said first main body between an open state and a closed state in which said transparent region directly overlaps a surface of said first display unit on said first main body;
    a detecting unit detects whether said second main body is in one of said open state and said closed state; and
    a control unit enables said first touch sensor while disabling said second touch sensor in response to said detecting unit has detected that said first and second main bodies are in said open state, and enables said second touch sensor while disabling said first touch sensor in response to said detecting unit has detected that said first and second main bodies are in said closed state.

2. The electronic apparatus of claim 1, wherein said second main body is rotatably connected to said first main body via a hinge.

3. The electronic apparatus of claim 2, wherein said transparent region is located along an edge adjacent to said hinge.

4. The electronic apparatus of claim 1, wherein when said first and second main bodies are in said closed state, the contents on said first display unit of said first main body are visually recognizable through said transparent region.

5. The electronic apparatus of claim 1, wherein said second touch sensor has a higher sensitivity than said first touch sensor.

6. The electronic apparatus of claim 1, wherein each of said first touch sensor and said second touch sensor includes an electrode layer made of thin metallic wire mesh.

7. The electronic apparatus of claim 6, wherein at least one of said electrode layers has a different micro pitch of said thin metallic wire mesh from said other electrode layer.

8. The electronic apparatus of claim 1, wherein said first display is smaller than said second display.

9. The electronic apparatus of claim 1, wherein said first touch sensor receives user inputs when said first and second main bodies are in said open state, and said second touch sensor receives user inputs when said first and second main bodies are in said close state.

10. The electronic apparatus of claim 1, wherein said first main body is provided with a first transparent cover for covering said first touch sensor.

11. The electronic apparatus of claim 10, wherein said second main body is provided with a second transparent plate for covering said second touch sensor.

12. The electronic apparatus of claim 1, wherein said transparent region allows a user to view contents on said first display when said first and second main bodies are in said closed state.

13. An electronic apparatus, comprising:
    a first main body having a first display unit and a first touch sensor overlapping said first display unit, wherein said first main body further includes a keyboard provided on a same surface as said first display unit;
    a second main body having a second display unit, a transparent region, and a second touch sensor overlapping said transparent region, wherein the size of said transparent region is substantially identical to the size of said first display unit, wherein said second main body is rotatable with respect to said first main body between an open state and a closed state in which said transparent region directly overlaps a surface of said first display unit on said first main body;
    a detecting unit detects whether said second main body is in said open state or said closed state; and
    a control unit controls said touch sensor, wherein said control unit increases a sensitivity of said first touch sensor when said detecting unit has detected that said second main body has gone from said open state into said closed state, and to decrease said sensitivity of said first touch sensor when said detecting unit has detected that said second main body has gone from said closed state into said open state.

14. The electronic apparatus of claim 13, wherein said second main body is rotatably connected to said first main body via a hinge.

15. The electronic apparatus of claim 13, wherein when said first and second main bodies are in said closed state, said first display unit of said first main body is visually recognizable through said transparent region.

16. The electronic apparatus of claim 13, wherein said transparent region allows a user to view contents on said first display when said first and second main bodies are in said closed state.

17. The electronic apparatus of claim 13, wherein said transparent region is located along an edge adjacent to said hinge.

* * * * *